3,782,972
ESSENCE FOR ENHANCING THE FLAVOR OF
CITRUS JUICES
Cederic D. Atkins and John A. Attaway, Winter Haven,
Fla., assignors to State of Florida, Department of Citrus
Filed Jan. 26, 1971, Ser. No. 109,922
Int. Cl. A23l 1/02, 1/26
U.S. Cl. 426—192                                      16 Claims

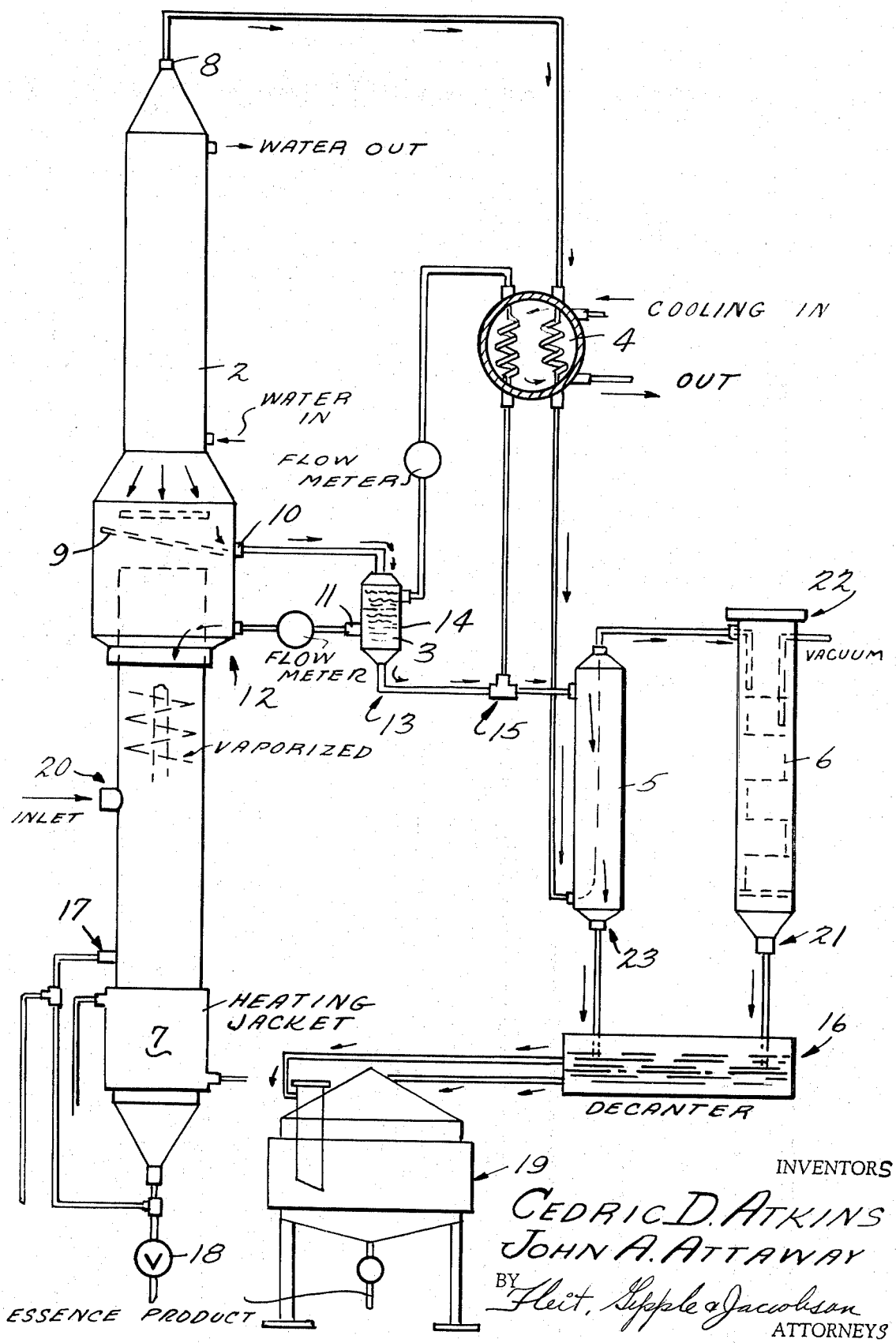

ABSTRACT OF THE DISCLOSURE

An aqueous citrus essence is prepared having an enhanced content of components which contribute to the natural flavor of the citrus juice, particularly certain aldehyde type compounds and a decreased content of components, such as easily oxidized fatty substances, which detract from the flavor of the juice. Preparation of the enhanced citrus essence is accomplished by increasing the alcoholic content of the aqueous phase of the essence so that its capacity for desirable aldehyde type components is increased. The increase in alcoholic content is effected by recirculation under appropriate conditions of temperature and pressure of the aqueous phase of the essence in contact with fresh essence. An apparatus is specifically disclosed for effecting the process of the invention. Enhanced essence produced by the present invention is particularly useful for reconstituting the flavor of citrus juice concentrates such as orange juice.

---

This application relates to a process and apparatus for recovering flavor and aroma essences from citrus juices and, more particularly, to a novel process for isolating those essence components which contribute to enhanced odor and flavor in citrus juices without including undesirable amounts of components normally present in the essence which can detract from the odor and flavor of natural juice. This invention is further concerned with citrus juice concentrates to which have been added specific quantities of the natural flavor and aroma essences obtained by the process of this invention.

Natural, full strength citrus juices contain a number of essence components which contribute to their flavor and aroma. For example, 12.8° Brix orange juice contains about .080–.020% ethyl alcohol, .100–.020% peel oil, .010–.001% various ester components, .10–.05% fats or fat related compounds, and about .001–.0005% aldehyde type components.

In order to prepare a concentrate, this juice must be heated to a sufficiently high temperature to evaporate some of the water present in the juice; however, such heating also drives off the various essence components, some of which become entrained in water droplets. The unfortunate result is that when the resulting juice concentrate is reconstituted (for example, from a 70° Brix concentrate to an about 12° Brix juice) by the addition of water, the reconstituted juice has a bland taste due to the presence of only traces of remaining oil and water soluble essence components.

As a result of this problem, it has been the practice to limit concentrations of orange juice, for example, to no more than about 4-fold or 45° Brix (i.e., requiring 3 parts of water to reconstitute 1 part of juice concentrate) since, by avoiding additional evaporation of water from the natural juice to obtain further concentration, less of the essence components are removed.

In addition, it has often been the practice to restore to the concentrate a portion of the essence components from orange and other citrus juices removed during concentration of the juice to restore, at least in part, some of the natural flavor of the juice.

One of the problems which has been associated, however, with the removal of essences from citrus juices is that these essences are composed of a number of components which affect flavor and aroma of the juice in different ways. Further, these components do not always remain present in the same proportions in the extracted essence as in the natural juice. Typically, for example, when orange oil is distilled in the presence of orange juice (as in an evaporator unit) there is a significant decrease in the aldehyde content of the essence and increase in the ester content.

Also, of considerable significance is the fact that some of the essence components either contribute directly to adverse flavor and aroma when added back to the juice or undergo chemical changes to form compounds with undesirable characteristics.

Table I gives the composition of essence extracted from 12.8° Brix orange juice. Table II gives the composition of peel oil contained in orange essence.

TABLE I

Orange juice essence

|  | Range (percent) | Typical Percent | P.p.m. |
|---|---|---|---|
| Peel oil | 0.020–0.100 | 0.030 | 300 |
| Alcohols | 0.020–0.080 | 0.040 | 400 |
| Ester | 0.001–0.010 | 0.0005 | 5 |
| Aldehydes | a 0.0020–0.005 | 0.0027 | 27 |
| Fats | 0.05–0.10 | 0.07 | 700 |
| Balance water. | | | | a Includes about 0.001–0.0005% diacetyl.

TABLE II

Orange peel oil

|  | Range (percent) | Typical (percent) |
|---|---|---|
| Aldehyde | 0.93–1.83 | 1.2 |
| Ester | 0.04–1.63 | 0.8 |
| Alcohol | 2.0–4.0 | 2.5 |
| d-Limonene | 93.5–97.05 | 95.5 |

The actual composition of the volatile essence present in citrus juices, and especially orange juice, is quite complex and consists of a large number of compounds. For a detailed examination of these components one may have reference to numerous publications on the subject. (See Attaway et al., "The Isolation and Identification of Some Volatile Carbonyl Components From Orange Juice," Journal of Agricultural Food Chemistry, 10, pp. 102–104; and Attaway et al., "Identification of Alcohols and Volatile Organic Acids From Natural Orange Essence," Journal of Agricultural Food Chemistry, 12, pp. 118–121.)

As can be seen in Table I, however, orange juice essence contains, among other components, peel oil, consisting largely of d-limonene, fats (including various lipids or fatty esters, e.g., triglycerides) and diacetyl. This large amount of d-limonene, for example, has been found to adversely affect flavor and aroma of the essence and to be far in excess of what is required for reconstitution of the flavor of juices. Further, the lipids present are easily oxidized during heating (as in evaporation and concentration) to components having decidedly unpleasant flavor and aroma characteristics. These undesirable features have also been found to be characteristic of the diacetyl present in the essence.

Of course, present along with these components in the essence are the various other compounds which are conveniently grouped as alcohols, esters, and aldehydes (including ketones and diacetyl). Of these compounds, the "aldehyde" type compounds in particular, contribute significantly to the natural flavor and aroma of the juice. Typical of these compounds are n-decanal, geranial, citronellal, ethanol, linalool, n-octanol, terpinolene, d-terpineol, and sabinene; although it is appreciated that not all of these compounds are, strictly speaking, aldehydes, nor is this an exhaustive list of those components present in orange essence which can be said to enhance the natural orange flavor and aroma.

It is, however, a problem in separating the desirable and undesirable flavor and aroma affecting components of citrus, and especially orange essences, that the essence readily separates into an aqueous and an oil phase, both of which phases contain desirable essence components. The oil phase in particular also, however, contains the greater part of the undesirable flavor components.

Accordingly, because of the mixed presence in the oil and water phase of the essence, particularly, of both components which contribute to the natural flavor of the juice and those which either themselves, or in their oxidation products, adversely affect the flavor and aroma of the juice, it has been possible to add only limited amounts of these essences back into either the juice concentrate or the reconstituted juice. These amounts have not generally been sufficient, moreover, to restore the natural flavor to the juice.

Thus, in order to more fully restore the natural flavor of concentrated and reconstituted citrus juices, it would be desirable to obtain an essence for reincorporation into the juice which contains selective amounts of those components which contribute to the natural flavor and aroma without incorporating those essence components which detract from the flavor and aroma.

U.S. Pats No. 3,248,233 to Brent et al., for example, describes a process and apparatus for recovering essences from orange juice or other fruit juice concentrate to enhance the flavor. According to the process of the Brent et al. patent, orange juice is first evaporated under vacuum to separate out the essences which are then contacted with a stream of water and subsequently condensed under pressure to obtain a solution of the essences. There is, however, no attempt to separate the various components of the essence according to whether they are features which enhance or detract from the flavor and aroma of the juice.

It is, therefore, an object of the present invention to provide a process and apparatus whereby those components which are present in citrus juice essence vapors and which contribute to enhanced flavor and odor of natural citrus juice are separated and isolated in pre-selected amounts from other components of the essence vapors which detract from the flavor and odor of natural juice.

It is a further object of this invention to obtain an improved water soluble essence extract containing desirable flavor, and aroma components which can be added to citrus juice which may, for example, be in the form of concentrate, in order to improve the natural flavor and odor of the juice.

These and other objects have been achieved according to the present invention, whereby it has been found that desirable flavor and aroma enhancing essence components, which are present in both the oil and aqueous phase of citrus juice essences, can be selectively removed under appropriate conditions from the oil phase into the aqueous phase by contacting the oil phase with dilute aqueous solutions of alcohols naturally occurring in citrus juice essences such as, for example, ethanol. Unexpectedly, it has been found that, under appropriate conditions, the desirable flavor and aroma enhancing components present in this oil phase are selectively removed into the aqueous alcoholic phase while undesirable components which adversely affect flavor and aroma of orange juice are left behind in the oil phase. Further, since the water-soluble phase and the oil phase are mutually immiscible, the oil phase, which is lighter, can readily be separated from the heavier water phase into which the alcoholic and flavor and aroma enhancing components have been extracted, resulting in a water soluble essence which can be used to reconstruct the natural flavor of citrus juices in reconstituted juices, for example, and which does not contain certain components naturally present in citrus essence but which unfavorably affect the flavor of the juice.

In a further embodiment of the present invention, it has been found that the level of naturally occurring alcoholic components (primarily ethanol) which are found to be present largely in the aqueous phase of the citrus essence, can be greatly and unexpectedly increased up to a level of up to about 95% by repeatedly recirculating and contacting the water-soluble essence phase as vapor with fresh vaporized orange essences containing both the oil and water-soluble phases. According to this embodiment of the present invention, the combined water-soluble and oil phases are separated by any convenient method, such as decanting, and the water-soluble phase vaporized and again contacted at appropriate conditions of temperature and pressure with fresh essence vapor to remove alcoholic components from the fresh vapor and further increase the level of alcoholic components in the water-soluble phase. By carrying out this decanting, vaporization, and re-contacting procedure with the water-soluble orange essence phase while continually removing excess water and solid particles from the bottom of a reflux type stripping column and also removing non-condensible vapors and gases from the top of the column it is possible to increase the level of alcoholic components in the water soluble phase to about 95%.

In yet a further embodiment of the present invention the two procedures described above are advantageously combined in order to provide a novel technique for selectively extracting a water-soluble essence, suitable for reconstitution into full strength or concentrated orange juice and containing selected amounts of those flavor and aroma enhancing components found in citrus essence without the presence of excess or undesirable flavor and aroma components such as di-limonene, diacetyl, and fatty esters and related compounds derived from lipid or "fat" constituents of orange juice which are easily oxidized during heating to produce undesirable flavor and aroma components.

According to the present invention, volatile essence vapors are passed into a reflux type stripping column having heater and condenser sections where pulp, insoluble solids, fatty materials, and excess water are removed. Air and entrained volatiles (consisting largely of distilled peel oil, diacetyl, etc.) are removed from the top of the stripping column, while the condensible water and oil essence phases are collected and removed from the side of the column. In order to properly carry out this separation as well as subsequent refluxing procedures whereby the alcohol content of the aqueous essence phase is increased, the column is maintained by a heater at a temperature of about 140° F. to 200° F. and a pressure of 24 to 29 inches of mercury.

The combined oil and water essence which is removed from the column is separated into its respective oil and water phases, for example, by decanting, the lighter oil phase readily rising to the top of the heavier water phase. The water phase is recycled back into the stripping column and refluxed in contact with additional fresh essence vapor whereby the level of naturally occurring alcoholic components in the water phase is increased. Enrichment of the water phase by flavor enhancing aldehyde type components also occurs during the refluxing in the stripping column. Subsequently, this water phase containing an increased level of alcoholic components is further contacted with the oil phase and scrubbed with the air and entrained volatile vapors and gases removed previously from the stripping column to further enhance removal of aldehydes into the aqueous phase.

This scrubbing procedure removes various ester and aldehyde components (except the esters of formic acid and diacetyl) into the aqueous phase containing enhanced alcohol content. Both the aqueous and oil phases are then removed from the bottom of the scrubber. Non-condensible gases, diacetyl, oxidized fatty components, air, and traces of other components from the combined water and oil phase are conveyed to a condenser where the remaining alcohol, aldehyde, and ester components are selectively trapped and combined in desired amounts with the oil and enriched aqueous phase removed earlier from the scrubber. The two phases being mutually immiscible are readily separated and the enriched aqueous essence phase retained. The non-condensed discharge from the condenser-trip is normally collected for evaluation to determine the extent of removal from the system of the undesirable essence components comprising largely diacetyl, fatty vapors, formic acid, and the esters of formic acid. The oil phase which is separated from the aqueous essence phase is largely (about 94–97%) d-limonene along with minor amounts of aldehydes, esters, and alcohols.

In the absence of increased amounts of alcohol in the aqueous phase re-circulated to the stripping column for contacting with excess peel oil, the retention of aldehydes is quite low and actually decreases with increasing concentration of the aqueous essence while the ester content increases. Thus, while a 100 fold essence was found to contain 900 p.p.m. of aldehyde and 1500 p.p.m. esters, when the essence was further concentrated to 300 fold the aldehyde level dropped to 500 p.p.m. and the ester level increased to 4500 p.p.m., where there was no enrichment of natural alcohols present in the aqueous phase.

However, using the techniques of the present invention, whereby the level of alcohols present in the aqueous phase was increased to 92%, the 100 fold essence contained 2,700 p.p.m. aldehydes and 500 p.p.m. esters. Moreover, when the concentration of the aqueous essence phase was increased to 300 fold, the level of aldehydes was 8,100 p.p.m. and the level of esters was 1500 p.p.m.

An additional feature of the present invention is the vacuum control or the positive air pressure present in the system during essence concentration. A vacuum lower than 24 inches of mercury provides sufficient oxygen to initiate the oxidation of ethyl alcohol and associated components to yield artifacts of aldehyde and ester nature in considerable quantity. This results in definite changes in the alcohol-aldehyde ratio present in the folded essences. Excessive recycling in the stripping column produces an equivalent effect and should be avoided. Thus the production of relatively anhydrous essences are more representative of fresh citrus juice essences when manufactured at a vacuum in excess of 24 inches, preferably about 24–29 inches of mercury. During production of high-fold relatively anhydrous essences condenser temperatures are most effective for prevention of losses at 32° F. or below.

For a further understanding of the present invention, reference is now made to the figure which shows an essence recovery unit for selectively recovering citrus essence containing components having desirable flavor and aroma properties but which are substantially free of deleterious components such as excess d-limonene, diacetyl, and lipids which are easily oxidized to produce unpleasant flavor and odor.

A spiral stripping column is shown generally at 1, which is provided with a boiler 7 located at the bottom of the column with discharge outlets located at the lower portion at 17 and 18. An overhead condenser 2 is located atop the spiral stripping column with a vent 8 at the top and inlets and outlets at 12 and 10 respectively. A trap for separating the water soluble and oil components of the essence is shown at 3. A condenser-cooler is shown at 4 for cooling non-condensible vapors and gases in one stream and the oil phase from the trap in another separate stream. Cooling for the condenser 4 is provided by suitable refrigeration supplied externally but not shown. A scrubber is shown at 5 for counter-currently contacting the oil phase and alcohol enriched water soluble phase along with non-condensible vapors and gases. The condenser 6 which contains a number of plates provides for condensing and removal of further oil essence from the gaseous residues from the scrubber 5. The decant vessel shown at 16 where the aqueous and oil phases from the scrubber 5 and condenser 6 are combined and then separated into their oil and water soluble components. The heavier water soluble phase containing alcoholic components and flavor and aroma enhancing constituents which have been removed in the scrubber 5 are removed from the bottom of the decant flavor and passed to a suitable storage tank shown at 19. From this storage tank the water soluble essence containing the desired components can be removed and used to enhance the flavor of reconstituted orange juice etc. as desired.

According to the process of the instant invention, orange essence vapors of about 100 to 300 fold, which contain less than about 0.08% oil and, for example, which can be obtained by conventional procedures such as flash evaporation of extracted juice under vacuum, are passed at a temperature of about 140°–200° F. at 20 into the spiral stripping column 1, having a boiler at the lower end shown at 7 which maintains the stripping column at a sufficient temperature to keep the essence vaporized. Various components such as fat bearing insoluble particles along with water are separated from the essence vapors at bottoms at 17 and 18 while non-condensible vapors and traces of components pass upwards in the column 1 and out of the top of the condenser at 8. Removal of these non-condensible vapors is facilitated by use of a vacuum of about 24–29 inches of mercury. Condensibles, which include both the oil and water-soluble phases are condensed in the overhead condenser 2 and flow back downward into the stripping column until they reach the collecting plate shown at 9 where they collect and flow out of the condenser at 10 to the trap shown at 3. In the trap, the heavier water soluble components collect at the bottom whereas the lighter oil phase collects at the top. Thus, the water phase can be removed at the side bottom of the trap 11 and returned to the spiral stripping column at 12 and overhead condenser for additional refluxing and contacting with fresh essence vapors, or alternatively, as desired, removed through the bottom of the trap 13. The lighter oil phase is removed from the trap through the top side opening 14 and then passed to one side of the cooler shown at 4.

As previously discussed, recycling of the water phase from the bottom side 11 of the trap 3 back into the spiral stripping column where it is refluxed with fresh essence vapor, has been found by the practice of this invention to result in increased levels of naturally occurring alcohol content in the water-soluble phase up to about 95% in the vapor present in the overhead condenser and also to increase the removal of aldehyde components into the aqueous phase. The water soluble phase containing the desired amount of alcoholic components and enhanced content of aldehyde type compounds is removed from the bottom of the trap 13 and directed at 15 into the stream of condensed oil phase from the top side of the trap 14 and condenser 4 and the mixture of the two components then passed into the scrubber 5 where the mixture is contacted at a temperature of about 45°–60° F. with the non-condensible gases which have been taken from the top of the overhead condenser 8, and passed through the cooling condenser 4 in a separate stream from the oil phase coming from the trap 3. In the scrubber 5, the water-soluble phase containing the enhanced level of alcoholic content selectively strips away additional desirable aldehyde type components from the oil phase and then is passed together with the oil phase out of the scrubber 5 to the decant vessel 16.

Undesirable components comprising primarily non-condensible fatty elements as well as traces of peel oil and other essence components are directed out of the scrubber 5 at the top to the condenser unit 6 which contains a number of reflux shelves and is maintained at a temperature of about 32°–40° F. By controlling the number of shelves or plates in the condenser the quantity of essence components and non-condensible vapor components recovered from the condenser 6 is determined. The more shelves present in the condenser, the greater will be the quantity of retained components of this type which are directed out of the bottom 21 of the condenser 6 to the decant vessel 16 where they are combined with the oil and water-soluble components from the scrubber 5. Typically, about 6–12 shelves are advantageously employed in the condenser. Generally, however, it is desirable to limit the amount of these components to not more than about 0.2% of the total fatty material present. Components such as the highly volatile diacetyl which are not removed from the condenser at 21 and conveyed to the decant vessel 16 are removed from the top of the condenser at 22 for analysis or discarded. Removal of these residual components is facilitated by application of a vacuum.

Condensed liquid comprising both the water-soluble phase and oil phase is removed from the bottom of the scrubber 5 at 23 and combined in the decant vessel 16 with the recovered components from the condenser 6. In the decant vessel, which is maintained at a temperature of about 35°–40° F. the oil and water phase are separated with the lighter oil phase being on top and the water-soluble phase removed through a tap at the bottom of the decanter vessel. This water soluble phase, which contains the desirable flavor and aroma components is then stored in a tank 19 preferably provided with means for chilling.

As previously pointed out, the percentage of alcohol present in the mixture presented into the scrubber 5 determines the quantity of aldehydes and certain other flavor components removed from the oil phase and retained in the water phase during contacting with fresh essence in the stripping column and during scrubbing with the non-condensible vent gases. Moreover, if the concentration of alcoholic water-soluble essence is carried to about 95%, the alcohol (plus very little water) and the oil phase are entirely miscible. Such high alcohol levels are generally not desirable, however, since the entire oil phase is thereby extracted resulting in the inclusion of a high level of undesirable components (e.g., d-limonene). Generally, however, these high alcohol concentrations are encountered in the vapor present in the overhead condenser atop the stripping column. Condensation produces substantial dilution of the alcoholic components as well as extracted flavor components. Further, some state regulations do not permit the inclusion of greater than 0.03% by volume of oil into single strength orange juice or concentrate so that the level of oil extracted into the water phase should be kept relatively low.

Advantageously, the aqueous phase obtained by the process of this invention contains about 10–70, preferably about 60 percent natural alcoholic components (mostly ethanol). At this range of alcohol level extractions of about 2500 to 9000 p.p.m. of aldehyde and ketone type components which contribute to improved flavor and aroma are obtained while levels of fatty acids or esters or their oxidation products are maintained below about 10 p.p.m. Most advantageously, the level of these components in the final water-soluble extract is about 3000–4500 p.p.m. At alcohol levels of below 5% only a level of 1500 p.p.m. aldehyde and ketone components is realized.

As heretofore noted, it is commonly the practice to separate citrus essence (e.g., by flash evaporation) from the fresh juice prior to concentration of the juice. In this manner, oxidation of the fatty components present in the essence is to a degree limited since the removed essence is not then subject to heating required to concentrate the juice to the desired Brix. The concentrate obtained in this way, however, is somewhat bland and requires reconstitution with a portion of the removed essence. Since this essence, however, contains fatty compounds which are nevertheless oxidized to a degree sufficient to adversely affect odor and taste, it is impossible to completely restore the natural flavor and aroma of the juice. This problem become more acute as higher degrees of concentration are reached in the juice, since proportionately more of the extracted essence must be added back to the concentrate to restore a semblance of the original flavor and aroma or reconstitution of the juice. Present orange juice concentrates, therefore, are limited to about 4 fold or 45°–50° Brix.

Using the essence prepared by the instant invention, however, which contains not more than about 0.2% total fatty materials, juice concentrates of substantially Brix can be prepared which on reconstitution to the single strength juice of about 12.5 Brix, have present essentially the same amouunts of naturally occurring aldehydes, ketones, alcohols, and oil which contribute to flavor and aroma as the original single strength juice substantially without the fatty components which adversely affect the flavor and aroma.

Generally, the water-soluble essence prepared according to the present invention can have the composition shown in Table IV, although it is to be appreciated that it is a feature of this invention that water-soluble essences having other ranges of components can also be prepared as desired.

TABLE IV

Water-soluble essence

| Component: | Percent (by vol.) |
|---|---|
| Alcohols | 4–12 |
| Aldehydes | 0.27–0.71 |
| Esters | 0.05–0.15 |
| Oils | 0.020–0.080 |

(mostly d-limonene)

Table V gives the composition of the oil phase from which the water-soluble Essence of Table IV is separated.

TABLE V

Oil phase

| Component: | Percent (by vol.) |
|---|---|
| d-Limonene | 94–97 |
| Aldehydes | 0.93–1.60 |
| Esters | 0.04–1.50 |
| Alcohols | 1.0–2.0 |

Table VI gives the composition of actual aqueous essences prepared by the present invention.

TABLE VI

Water-soluble essence derived from 100 gallons of orange juice of 12.8° Brix or 12.8% sugar solids
Compressed to the indicated gallons of essence
Corresponding vacuum 24.04 in Hg.

| | | | |
|---|---|---|---|
| (a) | 1 gal. 100 fold essence | 4.0% | 40,000 p.p.m. alcohol (ethyl). |
| | | 0.27% | 2,700 p.p.m. aldehydes. |
| | | 0.05% | 500 p.p.m. esters. |
| (b) | ½ gal. 200 fold essence | 8.0% | 80,000 p.p.m. alcohol (ethyl). |
| | | 0.54% | 5,400 p.p.m. aldehydes. |
| | | 0.10% | 1,000 p.p.m. esters. |
| (c) | ⅓ gal. 300 fold essence | 12.0% | 120,000 p.p.m. alcohol (ethyl). |
| | | 0.71% | 8,100 p.p.m. aldehydes. |
| | | 0.15% | 1,500 p.p.m. esters. |

Depending, among other things, on the degree of concentration of the juice, the water-soluble essence of this invention can be prepared to the desired concentration (fold), aldehyde, ketone, alcohol, and oil content. The following Table VII gives examples of typical orange essences prepared by the instant invention and used to restore the natural flavor etc. of high Brix concentrate:

TABLE VII

| Essence strength (fold based on strength of essence in single strength fresh juice) | Pump-out before reconstitution with essence | Reconstituted concentrate |
| --- | --- | --- |
| 1... 200 fold essence containing 4,000 p.p.m. aldehyde, ketone, and alcohol; about 0.2% total fatty material. | 70° Brix | 62° Brix 250 p.p.m. water soluble essence. 0.020% peel oil by volume. |
| 2... 100 fold essence containing 4,000 p.p.m. aldehyde, ketone, and alcohol; about 0.2% total fatty material. | ...do... | 56.6° Brix 200 p.p.m. water soluble essence. 0.020% peel oil by volume. |
| 3... 200 fold essence containing 4,000 p.p.m. aldehyde, ketone, and alcohol; about 0.2% total fatty material. | 65° Brix | 62° Brix 250 p.p.m. water soluble essence. 0.020% peel oil by volume. |
| 4... 300 fold essence containing 6,000 p.p.m. aldehyde, ketone, and alcohol; about 0.2% total fatty material. | ...do... | 56.6 Brix 200 p.p.m. water soluble essence. 0.020% peel oil by volume. |

The preferred high density concentrates of the present invention are about 5 to 6 fold concentrates of about 55° to 65° Brix and having viscosities not exceeding about 5000 cp. at 80° F. and preferably about 200–4000 c. The level of water soluble essence (aldehydes, ketones, and alcohols) present is preferably about 150–400 p.p.m. in the reconstituted concentrates and most preferably about 200–300 p.p.m.

EXAMPLE 1

Essence vapors obtained from extracted orange juice by flash evaporation were passed into a spiral stripping column at a temperature of about 140° F. and a rate of 1000 lbs./hr. The spiral stripping column was provided with a heating unit at its base and an overhead reflux condenser. During the continous refluxing of the essence vapors at a temperature of 140° F., water and solid fruit particles including fat bearing insolubles were removed from the bottom of the stripping column while non-condensible vapors and gases were removed from the top of the overhead condenser with the aid of a vacuum of 24 inches of Hg. Water soluble essence oils were collected near the bottom of the overhead condenser and passed to a trap where the heavier water soluble components were separated from the oil phase. The water soluble components were continuously recycled back into the overhead portion of the stripping column and the alcoholic content of the water soluble phase forming the bottom layer in the trap monitored and water soluble essence withdrawn as it reached a level of 15% by volume total alcohols. Simultaneously, the oil phase forming the top layer in the trap was drawn off at a rate of 4 gal./hr. and then passed along with the water soluble phase into a scrubber where the non-condensible gases and vapors from the overhead condenser were passed in countercurrent flow to these combined liquids at a temperature of 45° F. Residual gases were removed from the top of the scrubber and combined oil and water soluble liquid withdrawn from the bottom of the scrubber and decanted at a temperature of about 45° F. At the same time the non-condensible gases removed from the top of the scrubber were passed to a trap containing plates where additional oily components were condensed out. These condensed components were then combined at a rate of 0.5 gal./hr. with the liquid discharge from the bottom of the scrubber in a decanting vessel at a temperature of 45° F. and the water soluble phase from the bottom layer in the decant vessel removed and stored in a chilled tank. Analysis of the 100 fold water soluble essence removed from the decant vessel showed it to be 4.2% alcohol, 0.32% combined ketone and aldehyde, 0.050% oil and 0.005% fatty materials.

What is claimed is:

1. A water soluble citrus essence comprising about 4–12 percent by volume alcohol, 0.27–0.71 percent by volume aldehydes, 0.05–0.15 percent by volume esters, 0.02–0.08 percent by volume citrus oils, and the balance substantially water.

2. The citrus essence of claim 1 wherein said essence is orange essence.

3. The citrus essence of claim 1 wherein said oil phase is 0.02–0.03 percent by volume.

4. The citrus essence of claim 1 wherein said oil phase is substantially d-limonene.

5. The citrus essence of claim 1 which is a 100–300 fold essence.

6. A water soluble orange essence comprising about 4–12 percent by volume alcohols, 0.27–0.71 percent by volume aldehyde type components, 0.05–0.15 percent by volume esters, 0.02–0.08 percent by volume orange oil with the balance substantially water and having removed therefrom substantially the greater part of components selected from the group consisting of fatty substances, d-limonene, and diacetyl.

7. The orange essence of claim 6 wherein said orange oil is present in amounts of about 0.02–0.03 percent and the fatty substances are present in amounts of no more than about 0.2 percent.

8. An orange juice concentrate which has been fortified by the inclusion therein of a minor portion of a water soluble orange essence comprising about 4–12 percent by volume alcohols, 0.27–0.71 percent by volume aldehyde type components, 0.05–0.15 percent by volume esters, 0.02–0.08 percent by volume orange oil with the balance water, and having removed therefrom substantially the greater part of components selected from the group consisting of fatty substances, d-limonene, and diacetyl.

9. The orange juice concentrate of claim 8 wherein the orange oil is present in the essence in amounts of about 0.02–0.03 percent and the fatty substances are present in amounts of no more than about 0.2 percent in the essence.

10. The orange juice concentrate of claim 8 wherein said orange essence is a 100–300 fold essence.

11. The orange juice concentrate of claim 10 wherein said orange essence is present in amounts of about 150–400 parts per million.

12. The orange juice concentrate of claim 11 wherein said orange essence is present in amounts of about 200–300 parts per million.

13. The orange juice concentrate of claim 10 which is about a 5–6 fold concentrate of about 55°–70° Brix.

14. A substantially anhydrous, water soluble citrus essence comprising about 92–94 percent by volume alcohols, 0.27–0.71 percent by volume aldehyde type components, 0.05–0.15 percent by volume esters, and 0.02–0.08 percent by volume citrus oils.

15. A substantially anhydrous, water soluble orange essence comprising about 92–94 percent by volume alcohols, 0.27–0.71 percent by volume aldehyde type components, 0.05–0.15 percent by volume esters, and 0.02–0.08 percent by volume orange oils, and having removed therefrom the greater part of components selected from the group consisting of fatty substances, d-limonene, and diacetyl.

16. The anhydrous essence of claim 15 wherein the orange oil is present in amounts of about 0.02–0.03 percent and the fatty substances do not exceed about 0.2 percent.

References Cited

UNITED STATES PATENTS

| | | | |
|---|---|---|---|
| 2,773,774 | 12/1956 | McCarthy et al. | 99—205 |
| 3,118,776 | 1/1964 | Byer et al. | 99—205 |
| 2,457,315 | 12/1948 | Milleville | 99—205 |
| 3,117,877 | 1/1964 | Byer et al. | 99—205 |
| 3,310,410 | 3/1967 | Lang et al. | 99—205 |
| 3,223,534 | 12/1965 | Kelly | 99—140 |
| 2,631,103 | 3/1953 | Kermer | 99—105 |
| 3,347,681 | 10/1967 | Platt | 99—140 |

OTHER REFERENCES

Morgan et al., Studies on Recovery of Essence from Florida Orange Juices, Food Tech., 1953, vol. VII, No. 8, pp. 332–336.

Memory, Food Flavorings, 1960, pp. 57–62.

Roger et al., Designing Distillation Equipment for Volatile Fruit Aromas, Food Tech., 1965, vol. 19, No. 1, pp. 69–72.

MORRIS O. WOLK, Primary Examiner

S. B. DAVIS, Assistant Examiner

U.S. Cl. X.R.

202—183; 426—229